United States Patent [19]

Bailey et al.

[11] Patent Number: 5,951,669
[45] Date of Patent: Sep. 14, 1999

[54] METHOD AND APPARATUS FOR SERIALIZED INTERRUPT TRANSMISSION

[75] Inventors: Robert L. Bailey; Lesley A. Bird, both of San Jose; James D. Kelly, Aptos, all of Calif.

[73] Assignee: Apple Computer, Inc., Cupertino, Calif.

[21] Appl. No.: 08/773,686

[22] Filed: Dec. 27, 1996

[51] Int. Cl.$^6$ ............................................. G06F 9/46
[52] U.S. Cl. ............................................ 710/260; 710/23
[58] Field of Search .................................. 395/733, 843, 395/853, 183.1

[56] References Cited

U.S. PATENT DOCUMENTS

| | | | |
|---|---|---|---|
| 5,473,757 | 12/1995 | Sexton | 364/131 |
| 5,475,854 | 12/1995 | Thomsen et al. | 395/843 |
| 5,634,069 | 5/1997 | Hicok et al. | 395/853 |
| 5,671,421 | 9/1997 | Kardach et al. | 395/733 |

OTHER PUBLICATIONS

"Serialized IRQ Support for PCI Systems," Version 6.0, Sep. 1, 1995, by Compaq Computer Corp., Cirrus Logic Inc., National Semiconductor Corp., OPTi Inc., Standard Microsystems Corp., Texas Instruments Inc., and VLSI Technology Inc.

*Primary Examiner*—Zarni Maung
*Assistant Examiner*—David M. Ovedovitz
*Attorney, Agent, or Firm*—Beyer & Weaver, LLP

[57] ABSTRACT

A computer system in which interrupt signals are serially transmitted from an input/output (I/O) controller is disclosed. The I/O controller initially receives the interrupt signals and then serially transmits them to an interrupt controller where the received interrupt signals are managed. According to the invention, the sequencing by which the interrupt signals are serially transmitted is controlled such that it largely conforms to the sequencing by which the received interrupt signals are processed at the interrupt controller, thereby controlling and reducing latency. The interrupt controller can be a separate integrated circuit chip or integral to another integrated circuit chip of the computer system.

22 Claims, 7 Drawing Sheets

METHOD AND APPARATUS FOR SERIALIZED INTERRUPT TRANSMISSION

BACKGROUND OF THE INVENTION

1. Field of the Invention

The present invention relates to computer systems and, more particularly, to transmission of interrupts within a computer system.

2. Description of the Related Art

A primary component of most computer systems (e.g., Apple Macintosh computers and IBM compatible computers) is a microprocessor. The microprocessor controls the operations of the computer system and interacts with other supporting devices or integrated circuit chips. One such supporting integrated circuit chip is known as an interrupt controller. An interrupt controller receives interrupt signals from a variety of peripherals or special purpose devices of or associated with the computer system. Examples of the peripherals or special purpose devices include: direct-memory-access (DMA) controllers, Ethernet boards or controllers, removable cards or storage devices (e.g., PC-CARDs, PCMCIA, data storage drives, etc.). The interrupt controller manages the various interrupt signals and then informs the microprocessor that an interrupt is needed to service one or more of the peripherals or special purpose devices.

FIG. 1 is a block diagram of a portion 100 of a conventional computer system. The portion 100 includes a microprocessor 102 and an interrupt controller 104. The interrupt controller 104 receives a plurality of interrupt signals 106, performs interrupt management processing, and then outputs a main interrupt signal 108 to the microprocessor 102.

In more recent computer system designs, interrupt controllers have become integrated within other supporting chips of a computer system. In one case, the supporting chip that cooperates with the interrupt controller is an input/output (I/O) controller of the computer system. The I/O controller manages the control of input and output operations to and from the computer system. Even though the interrupt controller is integrated within an I/O controller, the general functioning of the interrupt controller is the same as it was when the interrupt controller was a separate integrated circuit chip. Interrupt controllers have also been incorporated within supporting chips of the computer system other than the I/O controller.

FIG. 2 is a block diagram of a portion 200 of another conventional computer system. The portion 200 of the computer system illustrated in FIG. 2 includes an I/O controller 202, a memory controller 204, and a microprocessor 206. The memory controller 204 includes an interrupt controller 208. In other words, the integrated circuit chip housing the memory controller 204 also houses the interrupt controller 208. The various interrupt signals that the I/O controller 202 receives from the various peripheral and special purpose devices are forwarded to the interrupt controller 208 within the memory controller 204 via a plurality of links 210. The links 210 are preferably wires (e.g., metal traces on a circuit board) and each of the wires corresponds to one of the incoming interrupt signals received (or generated) by the I/O controller 202. Upon receiving the interrupt signals over the links 210, the interrupt controller 208 performs interrupt management processing and outputs a main interrupt signal 212 to the microprocessor 206.

The portion 200 of the computer system illustrated in FIG. 2 has a number of disadvantages. One disadvantage is that the number of links 210 connecting the I/O controller 202 to the memory controller 204 is large and onerous. In particular, one link 210 is required for each interrupt signal being supported by the computer system. For example, currently most Apple Macintosh computers being produced support at least 20–30 different interrupt signals. Thus, for the portion 200 of the computer system design illustrated in FIG. 2, at least 20–30 separate links 210 would be required. Another disadvantage is that both the I/O controller 202 and the memory controller 204 are required to have pins for each of the links 210 that are required.

One recent attempt to overcome the problems of the need for a substantial amount of wiring (links) and pins is documented in "Serialized IRQ Support for PCI Systems," Version 6.0, Sep. 1, 1995, by Compaq Computer Corporation, Cirrus Logic Inc., National Semiconductor Corporation, OPTi Inc., Standard Microsystems Corporation, Texas Instruments Inc., and VLSI Technology Inc. This approach operates to transmit interrupt signals serially from an I/O controller to an interrupt controller. While this approach is successful in reducing the number of links (wires) and pins required, it is disadvantageous in that a large latency can nevertheless be induced. More particularly, given that the forwarding of the interrupt signals by the I/O controller is done with a sequential processing, the reception of the interrupt signals at the interrupt controller is also performed with a sequential processing. As a consequence, this recent design is susceptible to large latencies which are undesirable in processing interrupt requests. Another disadvantage of this recent approach is that there is no support for edge triggered interrupt sources.

Thus, there is a need for an improved method and apparatus for managing interrupt requests from various sources with reduced latency and without requiring a large number or quantity of wires or pins.

SUMMARY OF THE INVENTION

Broadly speaking, the invention relates to a computer system in which interrupt signals are serially transmitted from an input/output (I/O) controller that initially receives or generates the interrupt signals to an interrupt controller where the interrupt signals are managed. According to the invention, the sequencing by which the interrupt signals are serially transmitted is controlled such that it largely conforms to the sequencing by which the interrupt signals are processed at the interrupt controller, thereby controlling and reducing latency. The interrupt controller can be a separate integrated circuit chip or integral to another integrated circuit chip of the computer system.

The invention can be implemented in numerous ways, including as a computer system, an apparatus, and a method. Several embodiments of the invention are discussed below.

As an interrupt handling apparatus, one embodiment of the invention includes: a first I/O controller in a first packaged integrated circuit chip, the first I/O controller receives or generates a plurality of incoming interrupt signals from a plurality of devices; an interrupt controller in a second packaged integrated circuit chip, the interrupt controller processes interrupts for a plurality of devices; a serial data link operatively connecting the first I/O controller of the first packaged integrated circuit chip and the interrupt controller of the second packaged integrated circuit chip; and a synchronization link operatively connecting the interrupt controller of the second packaged integrated circuit chip and the first I/O controller of the first packaged integrated circuit chip. The synchronization signal is transmitted from the interrupt controller to the first I/O controller over the synchronization link, and the incoming interrupt signals are serially transmitted from the first I/O controller to the interrupt controller over the serial data link in accordance with the synchronization signal.

Additionally, the interrupt handling apparatus may further include a clock link for supplying a clock signal from the interrupt controller to the first I/O controller such that the incoming interrupt signals are serially transmitted from the first I/O controller to the interrupt controller over the serial data link in accordance with the clock signal and the synchronization signal. The interrupt handling apparatus may also include additional I/O controllers that also serially transmit to the interrupt controller over the serial data link.

As an interrupt controller for receiving and processing a plurality of interrupt signals from a plurality of devices, an embodiment of the invention includes: a serial data input port for receiving a serial stream of interrupt signals; means for sequentially selecting and processing each of the interrupt signals within the serial stream; a synchronization manager for producing a synchronization signal, the synchronization signal being used to align the transmission of the interrupt signals within the serial stream to the respective processing of the received interrupt signals; and a synchronization signal output port for forwarding the synchronization signal external to the interrupt controller. The interrupt controller can be a dedicated integrated circuit chip or part of a multi-function integrated circuit chip.

As a method for synchronizing transmission of interrupt signals from a first integrated circuit chip that receives or generates the interrupt signals to an interrupt controller, an embodiment of the invention includes the operations of: placing the interrupt signals to be transmitted in a first sequential order; receiving an alignment signal from the interrupt controller; and serially transmitting the interrupt signals to the interrupt controller in accordance with the first sequential order and the alignment signal. The method may further include the operations of: receiving the transmitted interrupt signals at the interrupt controller; processing the received interrupt signals in a second sequential order; and producing and transmitting the alignment signal based on the second sequential order.

As a method for transmitting interrupt signals to an interrupt controller from a first integrated circuit chip that receives or generates the interrupt signals, another embodiment of the invention includes the operations of: placing the interrupt signals to be transmitted in a first sequential order; serially transmitting the interrupt signals to the interrupt controller in accordance with the first sequential order; receiving the series transmission of the interrupt signals at the interrupt controller; processing the received interrupt signals at the interrupt controller in a second sequential order; and forwarding a synchronization signal from the interrupt controller to the first integrated circuit chip to indicate a position in the second sequential order.

The advantages of the invention are numerous. One advantage of the invention is that a large and scaleable number of interrupt signals can be flexibly handled with a remotely located interrupt controller while requiring only a few pins and connecting wires. Another advantage of the invention is a reduced latency due to synchronization and alignment of the serial transmission of interrupt signals to an interrupt controller with the sequential processing of those signals at the interrupt controller. Yet another advantage of the invention is the ability to handle both level sensitive and edge triggered interrupt sources.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a computer system in which interrupt signals are serially transmitted from an input/output (I/O) controller (or other integrated circuit chip) that initially receives or generates the interrupt signals for an interrupt controller where the interrupt signals are managed. Because the I/O controller and the interrupt controller are typically within separate integrated circuit chips, the interrupt controller is said to be remotely located with respect to the I/O controller. According to the invention, the sequencing by which the interrupt signals are serially transmitted is controlled such that it largely conforms to the sequencing by which the interrupt signals are processed at the interrupt controller, thereby controlling and reducing latency. The interrupt controller can be a separate integrated circuit chip or integral to another integrated circuit chip of the computer system.

Embodiments of the invention are discussed below with reference to FIGS. 3–7. However, those skilled in the art will readily appreciate that the detailed description given herein with respect to these figures is for explanatory purposes as the invention extends beyond these limited embodiments.

Figure 1:
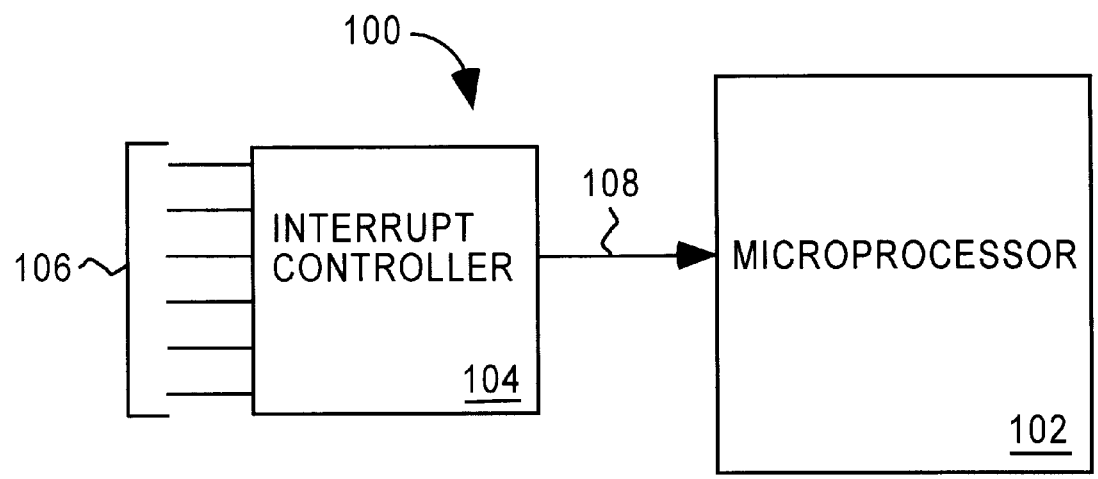
FIG. 1 is a block diagram of a portion of a conventional computer system.
Figure 2:
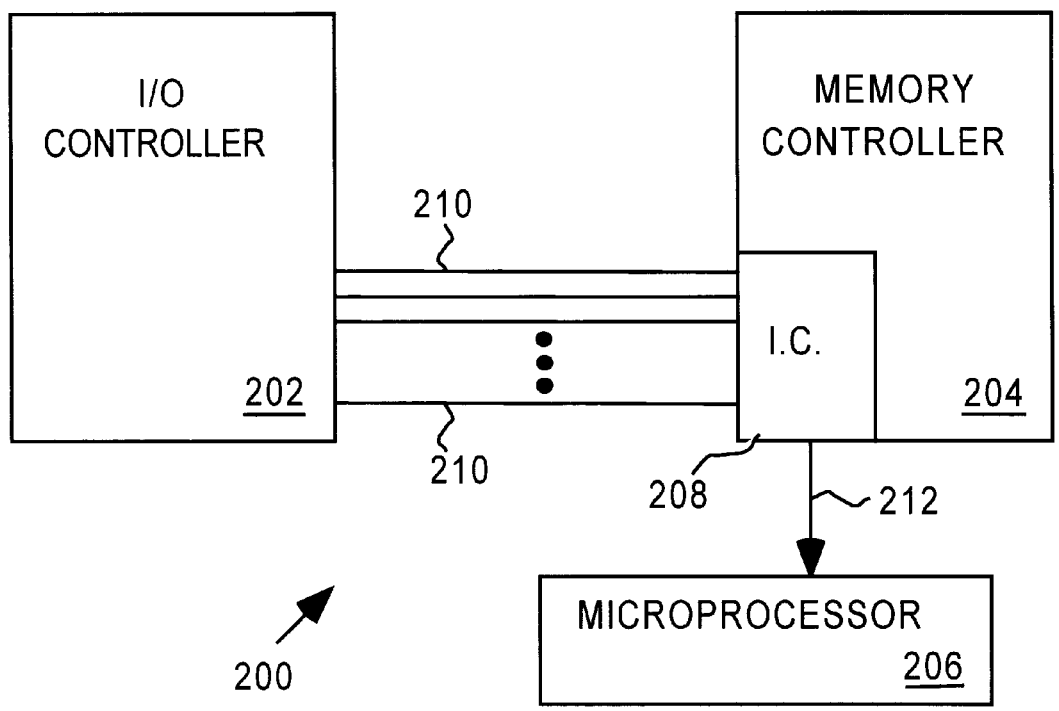
FIG. 2 is a block diagram of a portion of another conventional computer system.
Figure 3:
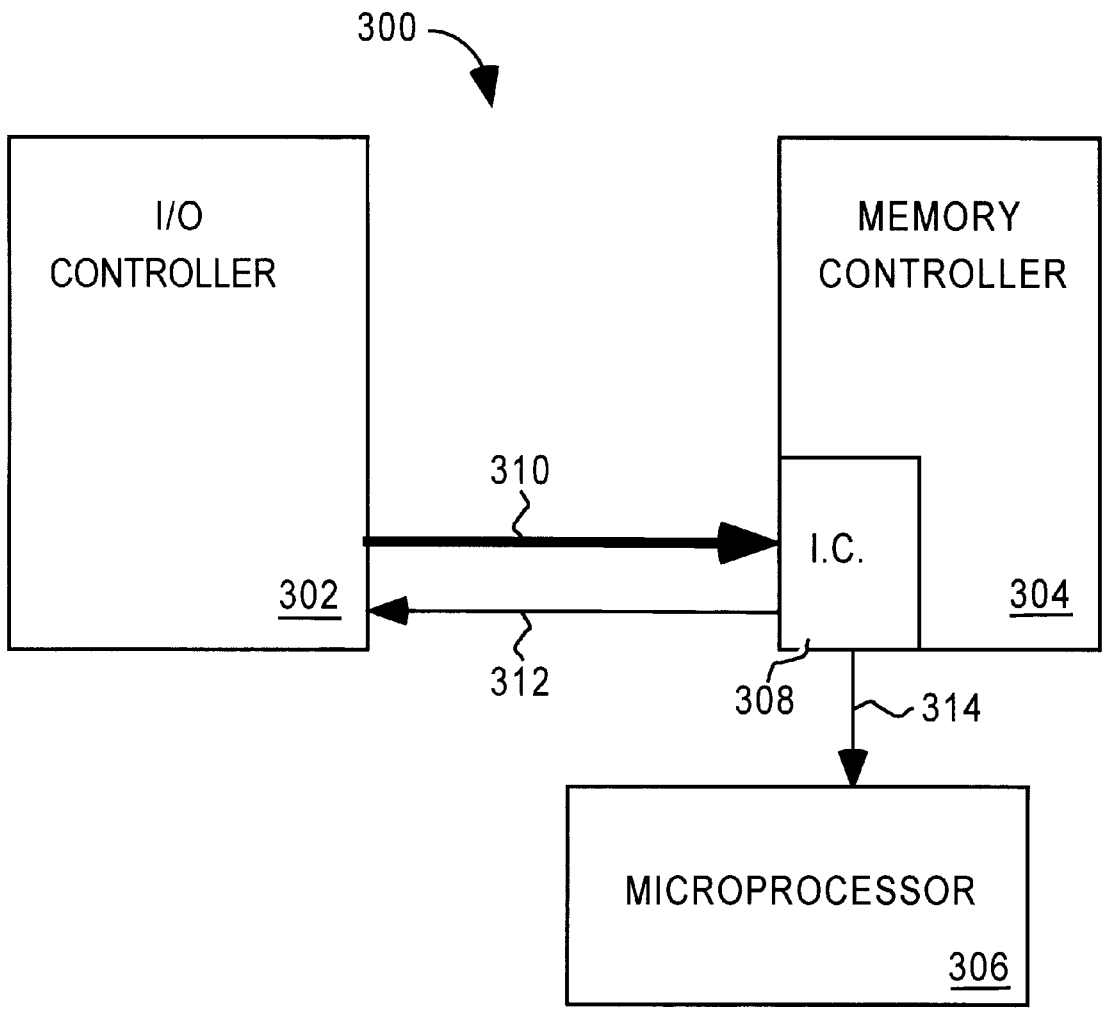
FIG. 3 is a block diagram a portion of a computer system according to a basic embodiment of the invention.

FIG. 3 is a block diagram a portion 300 of a computer system according to a basic embodiment of the invention. The portion 300 of a computer system includes an I/O controller 302, a memory controller 304, and a microprocessor 306. The memory controller 304 incorporates an interrupt controller 308. The interrupt controller 308 receives interrupt signals forwarded (serially transmitted) by the input/output (I/O) controller 302 over a serial link 310. The interrupt controller 308 also returns a synchronization signal 312 to the I/O controller 302. The interrupt controller 308 retrieves the various interrupt signals being transmitted over the serial link 310, performs interrupt management processing and then forwards a main interrupt signal 314 to the microprocessor 306. Upon receiving the main interrupt signal 314, the microprocessor 306 acts to service the peripheral or supporting device requesting the interrupt using techniques well known in the art. The synchronization signal 312 is utilized by the I/O controller 302 to synchronize the serial transmission of the interrupt signals with their respective processing by the interrupt controller 308.

The portion 300 of the computer system preferably supports both level sensitive interrupt sources and edge triggered interrupt sources. Level sensitive interrupt sources signal their request for an interrupt by the level of the signal. For example a "1" (logical high level) indicates an interrupt, whereas a "0" (logical low level) indicates no interrupt. As another example, with respect to edge triggered interrupt sources, a positive rising edge normally indicates a request for an interrupt.

Figure 4:
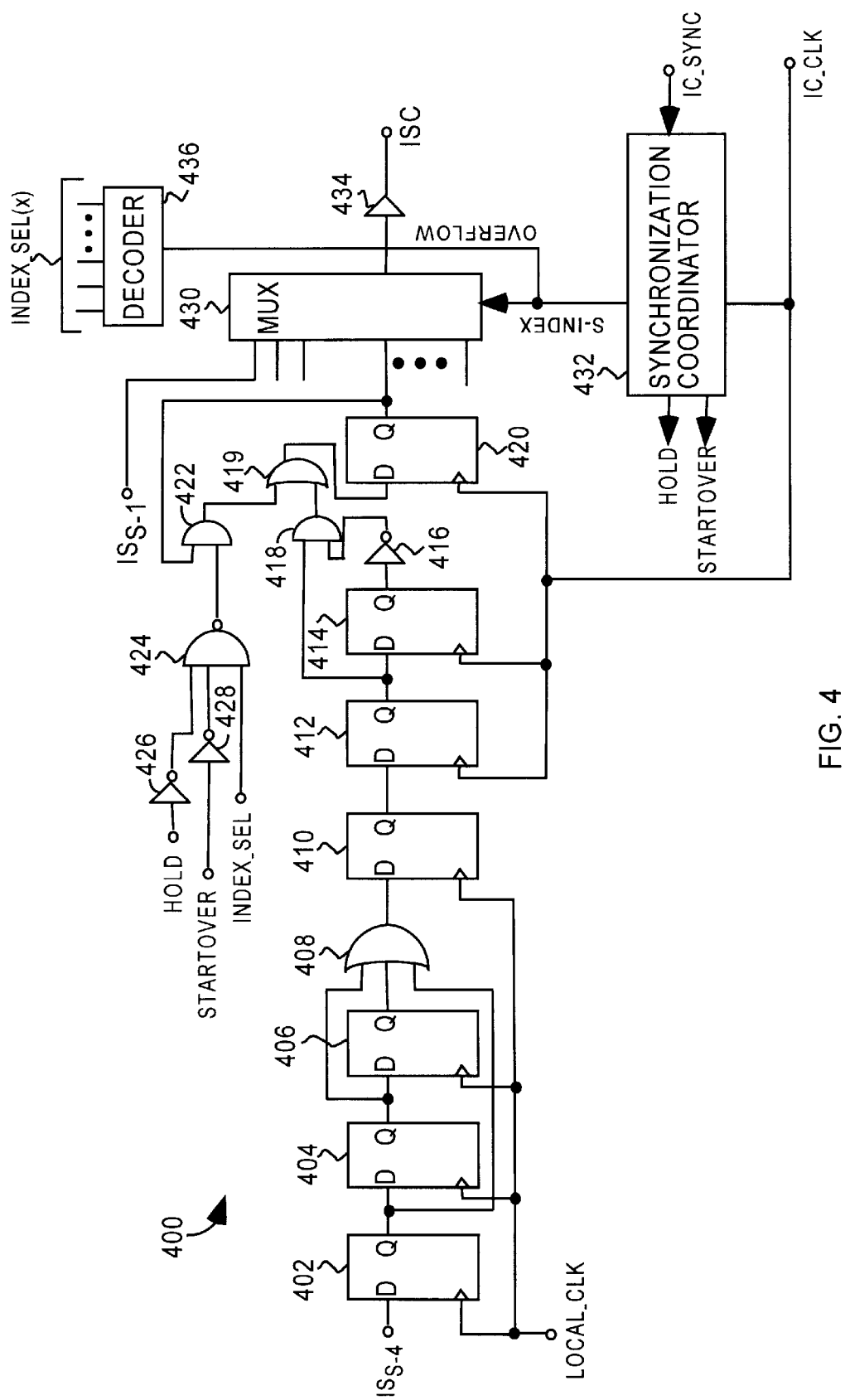
FIG. 4 is a schematic diagram of a transmission circuit for use in an I/O controller in accordance with an embodiment of the invention.

FIG. 4 is a schematic diagram of a transmission circuit 400 for use in the I/O controller 302 in accordance with an embodiment of the invention. The I/O controller 302 contains other circuitry that is not described herein because such additional circuitry is conventional and well known in the art and also not germane to the invention.

The transmission circuit 400 receives an interrupt signals (ISs) and outputs a combined interrupt signal (ISc) according to the invention. By intelligently controlling the sequence in which the various interrupt signals (ISs) are transmitted to the interrupt controller 308, the latency for the processing of the interrupt signals at the interrupt controller 308 is able to be minimized or at least significantly reduced. In other words, the synchronization signal 312 enables the controller 302 to align its serial transmission with the processing performed by the interrupt controller 308.

The transmission circuit 400 illustrated in FIG. 4 pertains to the circuitry for one of the incoming interrupt signal lines to the I/O controller 302, thus it should be understood that the circuitry would be replicated for each of the other incoming interrupt signal lines. The transmission circuit 400 illustrated in FIG. 4 is capable of handling both level sensitive interrupt sources and edge triggered interrupt sources. For example, in FIG. 4, the processing of two different interrupt signals (ISs) is illustrated and described. A first interrupt signal (ISs-1) is a level sensitive interrupt signal, and a second interrupt signal (ISs-4) is a edge triggered interrupt signal.

The transmission circuit 400 includes a series of D-type flip-flops 402, 404 and 406. Such D-type flip-flops 402–406 have a data terminal, a clock terminal and an output terminal. Each of the flip-flops 402–406 are clocked by a local clock (LOCAL$_{13}$ CLK) that is supplied to the clock terminal of the flip-flops 402–406. The input to the data terminal of the flip-flop 402 is the interrupt signal (ISs-4) for one particular interrupt source. The input to the data terminal of the flip-flop 404 is the output from the output terminal of the flip-flop 402. The input to the data terminal of the flip-flop 406 is the output from the output terminal of the flip-flop 404. An OR gate 408 logically ORs the outputs from the output terminals of the flip-flops 402–406. The output of the OR gate 408 is then forwarded and stored in a D-type flip-flop 410 in accordance with the local clock (LOCAL$_{13}$ CLK). The flip-flops 402–406 and 410 and the OR gate 408 together operate to stretch an incoming pulse on the interrupt signal (ISc) so as to insure that later circuitry synchronized to a lower frequency clock will detect the signal.

Next, the output of the flip-flop 410 is passed to a series connection of D-type flip-flops 412 and 414. The D-type flip-flops 412 and 414 have a data terminal, a clock terminal and an output terminal. More particularly, the data terminal of the flip-flop 412 receives the output from the output terminal of the flip-flop 410. The output from the output terminal of the flip-flop 412 is then forwarded to the data terminal of the flip-flop 414. The flip-flops 412 and 414 are clocked in accordance with an interrupt controller clock (IC$_{13}$ CLK) that is received at the clock terminals of the flip-flops 412 and 414. The flip-flop 412 operates to synchronize the data output by the flip-flop 410 to the interrupt controller clock (IC$_{13}$ CLK). The flip-flop 414 then simply provides a delay to the synchronized data output in the amount of one cycle of the interrupt controller clock (IC$_{13}$ CLK).

The output from the output terminal of the flip-flop 414 is inverted by an inverter 416 and then supplied as an input to an AND gate 418. The output from the output terminal of the flip-flop 412 is also supplied as an input to the AND gate 418. The output of the AND gate 418 is a pulse signal that detects a leading edge of the interrupt signal (ISs-4). The output of the AND gate 418 is supplied to an input of an OR gate 419. The output of the OR gate 419 is supplied to a D-type flip-flop 420. The D-type flip-flop 420 has a data terminal, a clock terminal and an output terminal. The output from an output terminal of the flip-flop 420 is supplied as an input to an AND gate 422. The other input to the AND gate 422 is supplied from an output of an NAND gate 424. The inputs to the NAND gate 424 are a hold signal (HOLD) after being inverted by an inverter 426, a start over signal (STARTOVER) after being inverted by an inverter 428, and an index select signal (INDEX$_{13}$ SEL). The hold signal (HOLD) signals the I/O controller 302 to hold (i.e., not change) its output for a clock cycle. The start over signal (STARTOVER) signals the I/O controller 302 to start over the transmission sequence from the beginning. The index select signal (INDEX_SEL) is an enable signal to enable the transmission circuit 400 for the one of the incoming interrupt signals to be transmitted. The output of the AND gate 422 is also supplied as another input to the OR gate 419.

The output of the flip-flop 420 is supplied to one of a plurality of input lines to a multiplexer 430. The multiplexer 430 couples one of the plurality of the input lines to an output line in accordance with a source index signal (S-INDEX). The multiplexer 430 outputs the combined interrupt signal (ISc) on the output line.

The above described circuitry 402–428 is utilized for each of the interrupt signals that is edge triggered. For each of the interrupt signals that are level sensitive, such as interrupt signal (ISs-1) illustrated in FIG. 4, the interrupt signal is able to be directly supplied to one of the input line of the multiplexer 430.

The source index signal (S-INDEX) is provided by a synchronization coordinator 432. The synchronization coordinator 432 receives an interrupt controller synchronization signal (IC$_{13}$ SYNC) and the interrupt controller clock (IC$_{13}$ CLK) from the interrupt controller 308. The synchronization coordinator 432 in addition to producing the source index signal (S-INDEX) also produces the hold signal (HOLD), the start over signal (STARTOVER) and an overflow signal (OVERFLOW). The use of the hold signal (HOLD) and the start over signal (STARTOVER) by the transmission circuit 400 has been described above. The overflow signal (OVERFLOW) output by the synchronization coordinator 432 is supplied to a tri-state buffer 434 at the output line of the multiplexer 430. The tri-state buffer 434 operates to disconnect the transmission circuit 400 from the serial link 310 when connection is no longer required by the transmission circuit 400. For example, when none of the transmission circuits for the various incoming interrupt signals being handled by the I/O controller 306 are transmitting, there is no need to have the output of the multiplexer 430 connected to the serial link 310. Instead, it is advantageous as discussed below because the computer system can then support multiple I/O controllers using the same serial link 310 and the same synchronization signal 312.

The transmission circuit further includes a decoder 436 for producing the various index select signals (INDEX$_{13}$ SEL(x)) for the various interrupt signals (IS), namely those of the interrupt signals that are edge detected interrupt signals. The decode 436 determines the index select signals (INDEX$_{13}$ SEL(x)) from the source index signal (S-INDEX) produced by the synchronization coordinator 432.

Figure 5:
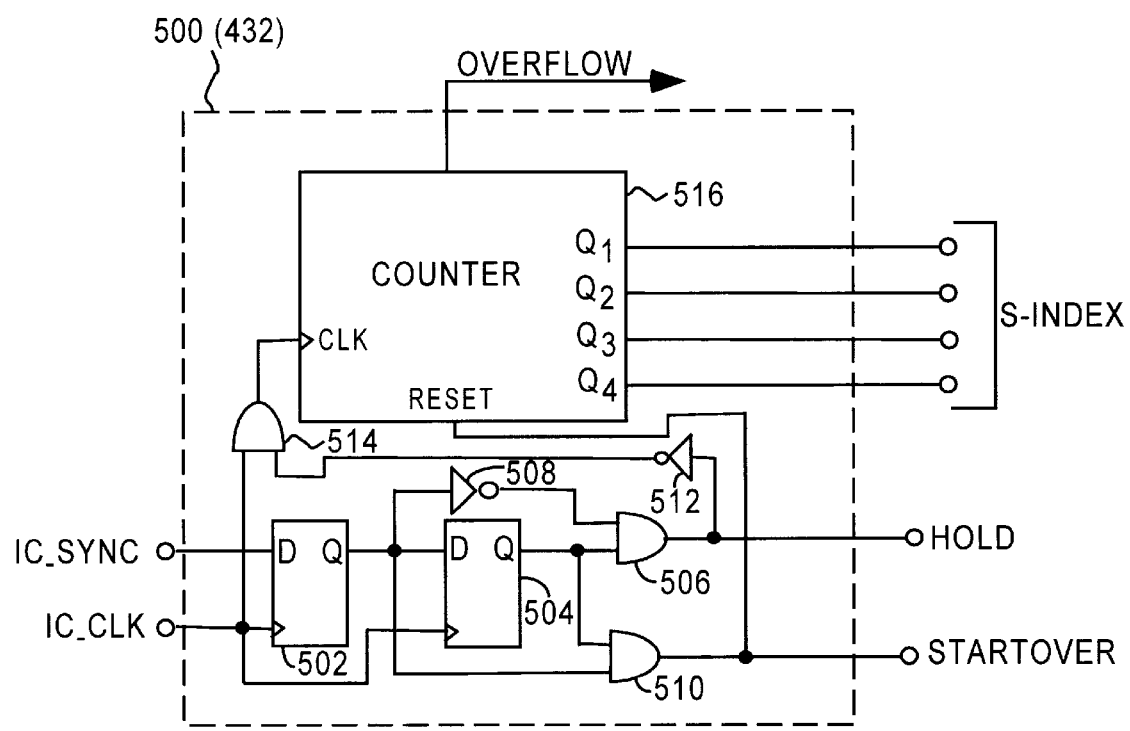
FIG. 5 is a schematic diagram of a synchronization coordinator according to an embodiment of the invention.

FIG. 5 is a schematic diagram of a synchronization coordinator 500 according to an embodiment of the invention. The synchronization coordinator 500 is a more detailed embodiment of the synchronization coordinator 432 illustrated in FIG. 4.

The synchronization coordinator 500 includes a D-type flip-flop 502 that receives the interrupt controller synchronization signal (IC$_{13}$ SYNC) at a data terminal, and receives the interrupt controller clock (IC$_{13}$ CLK) at a clock terminal. The output from an output terminal of the flip-flop 502 is supplied to a data terminal of a D-type flip-flop 504 and a clock terminal of the flip-flop 504 receives the interrupt controller clock (IC$_{13}$ CLK). Both the flip-flops 502 and 504 are thus clocked in accordance with the interrupt controller clock (IC$_{13}$ CLK).

The output from an output terminal of the flip-flop 504 is supplied to an input of an AND gate 506 as well as an input of an AND gate 510. The output from the output terminal of the flip-flop 502 is inverted by an inverter 508 and supplied to another input of the AND gate 506, and the output from the output terminal of the flip-flop 502 is supplied to another input of the AND 510. The output of the AND gate 506 provides the hold signal (HOLD). The output of the AND gate 510 provides the start over signal (STARTOVER).

The start over signal (STARTOVER) is also inverted by an inverter 512 and supplied as an input to an AND gate 514. The interrupt controller clock (IC$_{13}$ CLK) is supplied to another input to the AND gate 514. The output of the AND gate 514 is supplied to a clock terminal of a counter 516. The counter 516 produces an output count value (Q$_1$, Q$_2$, Q$_3$, . . . , Q$_n$). The output count value is the source index (S-INDEX) utilized by the multiplexer 430. The counter 516 counts (i.e., is clocked) in accordance with the output of the AND gate 514. Typically, the counter 516 will count a few extra counts beyond the total number of interrupt signals being supported by the interrupt controller 302 to support the start over sequence. After that, the counter 516 (within the I/O controller 302) produces the overflow signal (OVERFLOW) after sending all of its interrupt sources and then waits for the start over signal (STARTOVER) to restart counting from one. The start over signal (STARTOVER) is connected to a reset terminal of the counter 516 for this purpose.

Although not shown in FIGS. 4 and 5, the various circuitry included within the transmission circuit 400 and the synchronization coordinator 500 typically also includes reset circuitry to reset the transmission circuit 400 and the synchronization coordinator 500 following a reset signal or on power-up. However, to more clearly depict the invention, FIGS. 4 and 5 do not illustrate reset circuitry. Those skilled in the art are familiar with reset circuitry and reset operations.

Figure 6A:
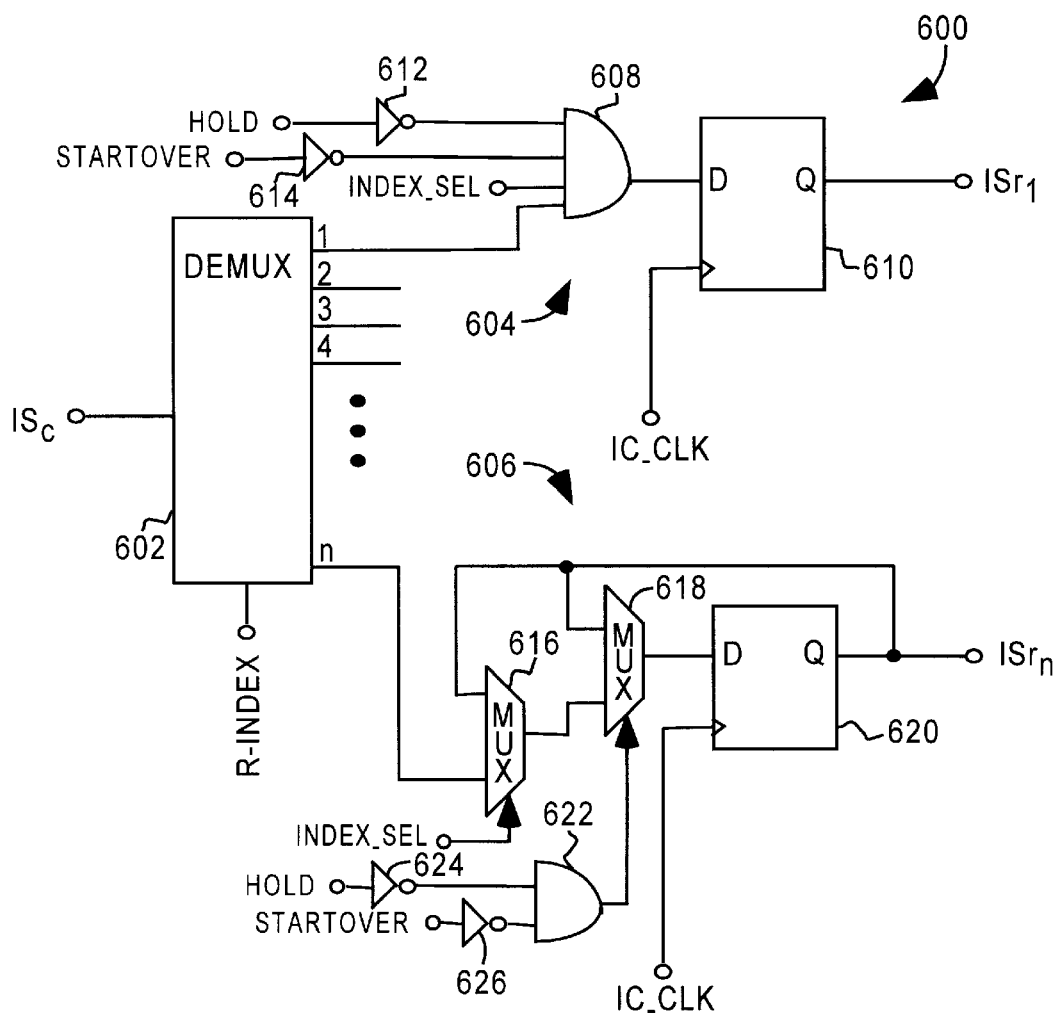
FIG. 6A is a block diagram of a reception circuit for use in an interrupt controller according to an embodiment of the invention.

FIG. 6A is a block diagram of a reception circuit 600 for use in the interrupt controller 308 according to an embodiment of the invention. The interrupt controller 308 contains other circuitry that is not described herein because such additional circuitry is conventional and well known in the art and also not germane to the invention.

The reception circuit 600 includes a demultiplexer 602 that receives the combined interrupt signal (ISc) that has been transmitted over the serial link 310 and then produces therefrom a plurality of interrupt signals. The interrupt signals are typically either edge triggered interrupt signals or level interrupt signals as described above.

Different circuitry within the reception circuit 600 is used to process these different types of interrupt signals. In particular, the reception circuit 600 includes a first circuit 604 for processing each of the received interrupt signals that are edge detected interrupt signals, and a second circuit 606 for processing each of the received interrupt signals that are level sensitive interrupt signals. Hence, although FIG. 6 illustrates only one implementation of the first and second circuits 604 and 606, it should be understood that the reception circuit 600 can include up to n such circuits of either type.

The first circuit 604 includes an AND gate 608 and a D-type flip-flop 610. The inputs to the AND gate 608 include a hold signal (HOLD) after being inverted by an inverter 612, a start over signal (STARTOVER) after being inverted by an inverter 614, an index select signal (INDEX$_{13}$ SEL), and one of the output lines from the demultiplexer 602. Each one of the output lines from the demultiplexer 602 correspond to a different one of the received interrupt signals. In this embodiment, a first output of n outputs from the demultiplexer 602 is supplied to the first circuit 604 for processing. The output of the AND gate 608 is supplied to a data terminal of the flip-flop 610. A clock terminal of the flip-flop 610 receives an interrupt controller clock (IC$_{13}$ CLK). The interrupt controller clock (IC$_{13}$ CLK) is preferably locally generated by the interrupt controller 308. The output of the flip-flop 610 is a received interrupt signal (ISr$_l$).

The second circuit 606 includes a multiplexer 616, a multiplexer 618, and a D-type flip-flop 620. The multiplexer 616 receives one of the interrupt signals from the demultiplexer 602. In this embodiment, the n$^{th}$ one of the outputs from the demultiplexer 602 is supplied to the second circuit 606 for processing. The multiplexer 616 also receives an output signal from an output terminal of the flip-flop 620. The multiplexer 616 selects one of its inputs in accordance with the index select signal (INDEX$_{13}$ SEL). The output of the multiplexer 616 is supplied as an input to the multiplexer 618 which also receives the output from the output terminal of the flip-flop 620 as another input. The output of the multiplexer 618 is selected in accordance with the output of an AND gate 622. The inputs to the AND gate 622 are the hold signal (HOLD) after being inverted by an inverter 624 and the start over signal (STARTOVER) after being inverted by an inverter 626. The output of the multiplexer 618 is then supplied to a data terminal of the flip-flop 620. The flip-flop 620 is clocked in accordance with the interrupt controller clock (IC$_{13}$ CLK) that is received at a clock terminal of the flip-flop 620. The output from the output terminal of the flip-flop 620 is a received interrupt signal (ISr$_n$).

The demultiplexer 602 receives the combined interrupt signal (ISc) over the serial link 310 and produces n different interrupt signals therefrom. The demultiplexer 602 sequentially outputs the interrupt signals in accordance with a receiver index signal (R-INDEX). Although not illustrated in FIG. 6, the various control signals utilized in the reception circuit 600, namely, the hold signal (HOLD), the start over signal (STARTOVER), the interrupt controller clock ($IC_{13}$ CLK), and the receiver index signals (R-INDEX) are produced by circuitry in the interrupt controller 308 such as the circuitry illustrated in FIG. 5 for the I/O controller 302.

Figure 6B:
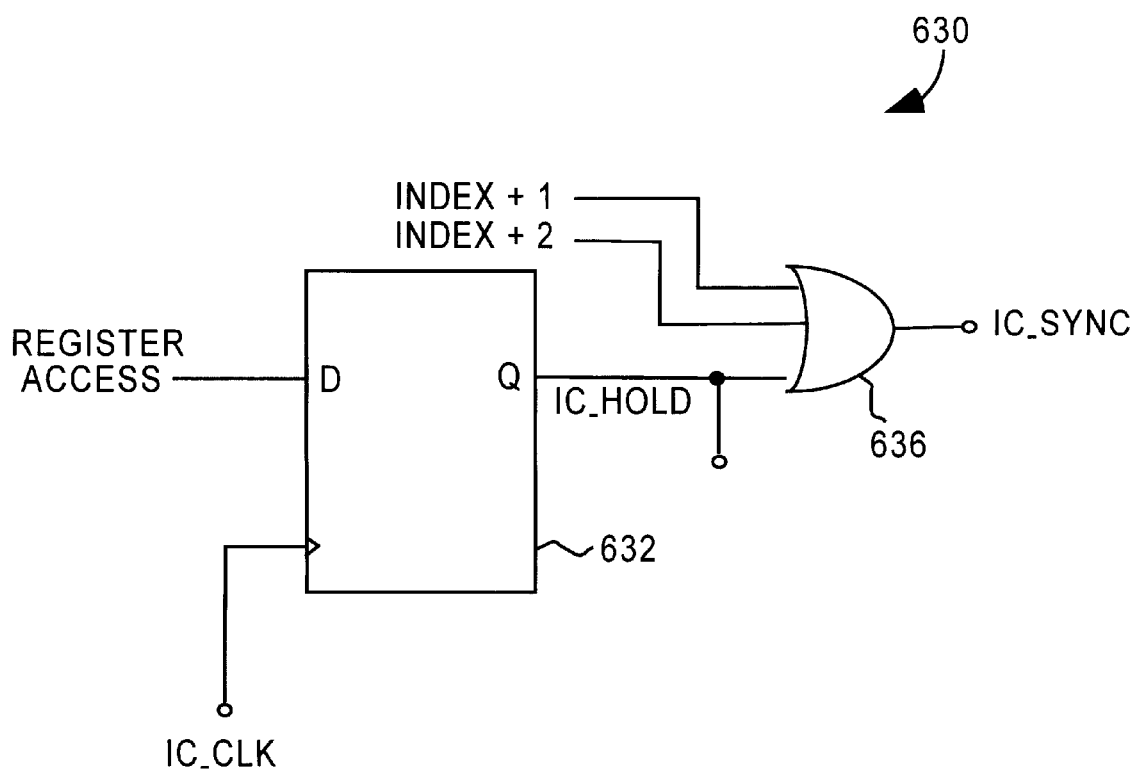
FIG. 6B is a schematic diagram of a synchronization signal generation unit according to an embodiment of the invention.

FIG. 6B is a schematic diagram of a synchronization signal generation unit 630 according to an embodiment of the invention. The synchronization signal generation unit 630 is preferably found within the interrupt controller 308. The synchronization signal generation unit 630 includes a D-type flip-flop 632 that receives a register access signal, and the interrupt controller clock ($IC_{13}$ CLK) at a clock terminal. The register access signal is active when a setup register of the interrupt controller 308 is being accessed. The output from an output terminal of the flip-flop 632 is the hold signal (HOLD). An OR gate 636 produces the interrupt controller synchronization signal ($IC_{13}$ SYNC) by logically ORing the hold signal (HOLD), a first index indicator (INDEX+1) and a second index indicator (INDEX+2). The first index indicator (INDEX+1) is active when the receiver index signal (R-INDEX) has been incremented once (one clock cycle) past the number of interrupt signals (e.g., n+1), and the second index indicator (INDEX+2) is active when the receiver index signal (R-INDEX) has been incremented twice (two clock cycles) past the number of interrupt signals (e.g., n+2).

The operation of the portion of the computer system 300 pertaining to the serial interrupt transmission according to the invention can be described as follows. The I/O controller 302 receives (and/or internally generates) n interrupt signals from peripherals or supporting devices. These n interrupt signals asynchronously change their status. The I/O controller 302 also receives the interrupt signal synchronization signal ($IC_{13}$ SYNC) from the interrupt controller 308. Then, the I/O controller 302 processes each the incoming interrupt signals following a predetermined sequence. The processing for each of the interrupt signals that are edge detected interrupt signals involves pulse stretching, edge detection, and pulse generation. Such processing for each of the interrupt signals that are level sensitive is not performed. After processing, the generated pulse representing the interrupt signal is coupled to the serial link 310. According to the predetermined sequence, normally the processing and transmission at the I/O controller 302 would, for example, be as follows in Table 1.

TABLE 1

1, 2, 3, 4, 5, . . . , n, 1, 2, 3, 4, 5, . . . , n, . . .

Hence, every n cycles the predetermined sequence is able to repeat. The embodiments illustrated in FIGS. 4–7, however, require the assertion of the start over signal (STARTOVER) each time the predetermined sequence is to be started. Thus, in the embodiments illustrated in FIGS. 4–7, the predetermined sequence (1, 2, 3, 4, 5, . . . , n) will be restarted after every start over signal (STARTOVER). In these embodiments, the start over signal (STARTOVER) is a "1" for at least two consecutive clock cycles. In this regard, when the synchronization coordinator 432 described in detail in FIG. 5 detects two consecutive "1" pulses on the interrupt controller synchronization signal ($IC_{13}$ SYNC), the start over signal (STARTOVER) is activated. Normally, the interrupt controller 308 will signal the synchronization coordinator 432 via the interrupt controller synchronization signal ($IC_{13}$ SYNC) to restart the predetermined sequence shortly (e.g., a few clock cycles) after it completes the sequence.

Concurrently with the transmission of the pulses representing the interrupt signal in sequence by the I/O controller 302, the interrupt controller 308 processes the received interrupt signal in accordance with a sequence. Normally, the sequence is the same as the predetermined sequence used to transmit the interrupt signals. The sequencing is controlled by the interrupt controller clock signal ($IC_{13}$ CLK) generated at the interrupt controller 308. Because the I/O controller 302 receives the interrupt controller synchronization signal ($IC_{13}$ SYNC) from the interrupt controller 308, the I/O controller 302 is able to align its transmission sequence to the sequence by which the received interrupt signal are processed at the interrupt controller 308. To further enhance the synchronization and alignment between the I/O controller 302 transmission and the interrupt controller 308 processing, the interrupt controller clock ($IC_{13}$ CLK) is forwarded from the interrupt controller 308 to the I/O controller 302 or generated from a conmmon source.

The synchronization and alignment provided by the invention is explained in more detail as follows. First, both the I/O controller 302 and the interrupt controller 308 are clocked (e.g., stepped) through each of the interrupt signals in the predetermined sequence in accordance with the interrupt controller clock ($IC_{13}$ CLK), this provides synchronization as both are clocked at the same frequency. Second, alignment is obtained between the transmission sequence at the I/O controller 302 and the processing sequence at the interrupt controller 308 by the hold signal (HOLD) and the start over signal (STARTOVER). Table 2 provides an example of the relative alignment between the two sequences in time.

TABLE 2

| Transmission Sequence | 1, 2, 3, 4, 5, . . . , n |
| --- | --- |
| Processing Sequence | 1, 2, 3, 4, 5, . . . , n |

The offset in time is typically predetermined according to the transmission and reception hardware delays.

The start over signal (STARTOVER) acts to align the transmission sequence at the I/O controller 302 with the processing sequence at the interrupt controller 308 every time the sequence repeats. The hold signal (HOLD) acts to preserve the alignment of the sequences when the processing at the interrupt controller 308 deviates from the predetermined sequence when processing the received interrupt signals. More particularly, when the I/O controller 302 receives a HOLD signal (HOLD), the predetermined sequence stops and does not change for a clock cycle. It is typical that the operation of the interrupt controller 308 may not always process the interrupt signals in the predetermined sequence (e.g., 1, 2, 3, . . . , n). For example, in certain existing interrupt controllers when an internal register (configuration-type register) is written or read in the interrupt controller 308, the predetermined sequence is deviated from so as to follow an out-of-order sequence because the register that has just been written or read is the next interrupt signal to be processed by the interrupt controller. For example, in one embodiment, if after processing interrupt signals 1 and 2, an internal register for interrupt signal 7 is read, then the interrupt controller holds for a cycle while the internal register is read and none of the interrupt signals is processed (because they share addressing hardware within the interrupt controller), and then the next processed interrupt signal is interrupt signal 3 which is a continuation of the appropriate predetermined sequence (3, 4, 5, . . . , n). Here, when an out-of-order cycle occurs, a one-cycle pulse is sent to the I/O controller 302 over the synchronization signal link 312 to instruct the I/O controller 302 to hold its serial data for one cycle and then thereafter resume transmission of the interrupt signals in accordance with the predetermined sequence. The hold action is signaled to the I/O controller 302 by the hold signal (HOLD). Note in the particular embodiment illustrated in FIGS. 4–6 the interrupt controller is not permitted to issue hold signals (HOLD) in adjacent clock cycles because the hardware would confuse this with the start over signal (STARTOVER). In this regard, the synchronization coordinator 432 described in detail in FIG. 5 detects a "1" pulse followed "0", the hold signal (HOLD) is activated. Table 3 provides a more involved example illustrating start over and hold operations for the synchronization and alignment provided by the invention.

TABLE 3

| STARTOVER | S | S | |
|---|---|---|---|
| HOLD | | | H |
| Transmission Sequence | 1, 2, 3, 4, 5, . . . , n, - - 1, 2, 3, 3, 4, 5, 6, . . . , n | | |
| Processing sequence | | 1, 2, 3, 4, 5, . . . , n, - -, 1, 2, H, 3, 4, 5, . . . , n | |

Note in the example illustrated in FIG. 3, the start over signal (STARTOVER) restarts the transmission sequence, the hold signal (HOLD) holds the third interrupt signal to maintain alignment in subsequent cycles, and the offset in alignment is fixed and minimized (to the extent of the hardware delays) for reduced latency. Note also that the latency from transmission to processing at the interrupt controller is minimized because the alignment of the transmission sequence and the processing sequence (with offset for physical delays) is such that transmission of the interrupt signals to the interrupt controller causes the interrupt signal will be received just before the interrupt controller processes the respective interrupt signals.

Figure 7:
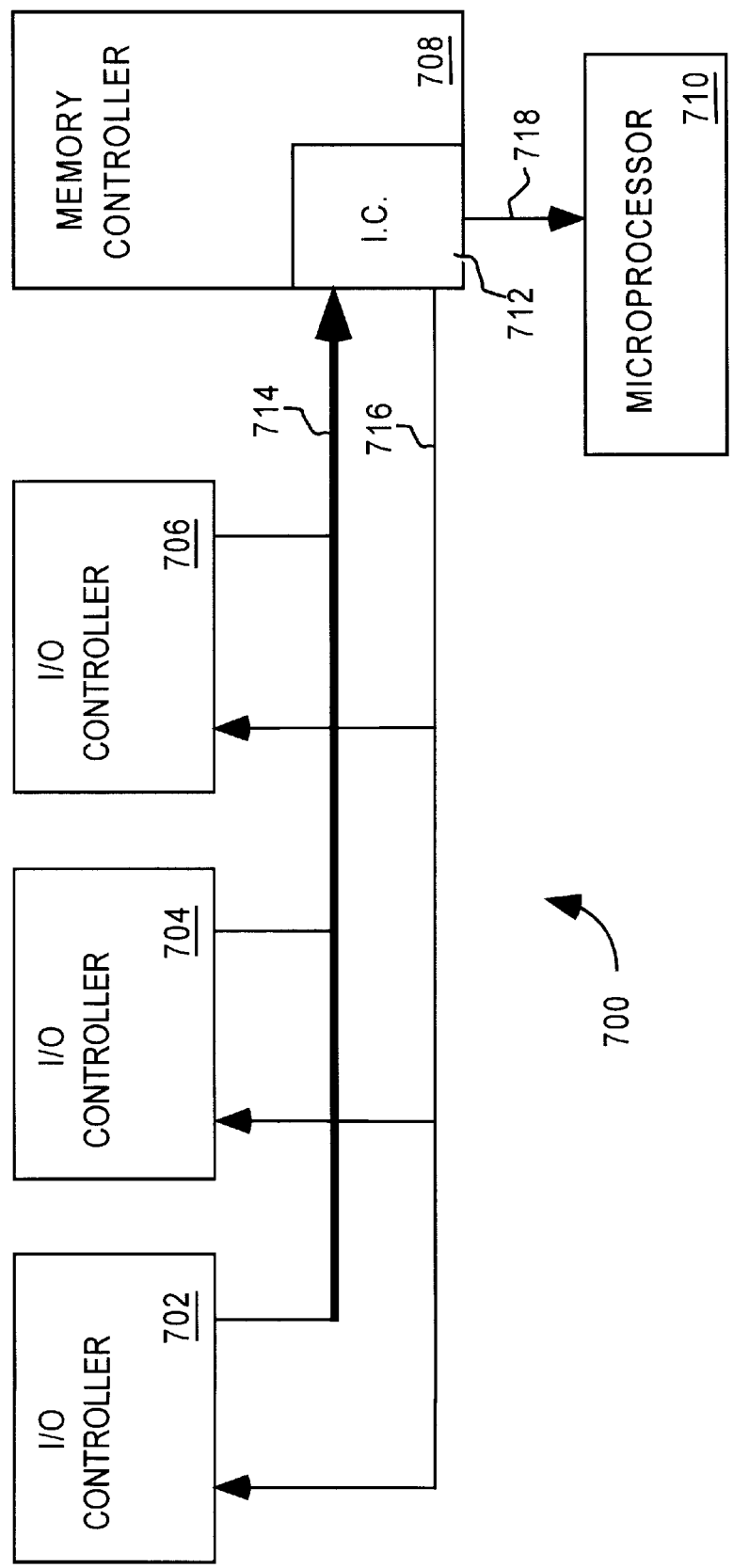
FIG. 7 is a block diagram of a portion of a computer system according to another embodiment of the invention.

FIG. 7 is a block diagram of a portion 700 of a computer system according to another embodiment of the invention. The portion 700 of a computer system illustrated in FIG. 7 is suitable for use when the computer system includes a plurality of I/O controllers that share a single interrupt controller for their interrupt management. In particular, the portion 700 of the computer system includes I/O controllers 702, 704 and 706, a memory controller 708, and a microprocessor 710. The memory controller 708 incorporates an interrupt controller 712. The I/O controllers 702–706 are coupled to the interrupt controller 712 through a serial link bus 714 as well as by a synchronization signal link 716. The interrupt controller 712 forwards a main interrupt signal 718 to the microprocessor 710. Since all the I/O controllers 702–706 know the sequence being utilized by the interrupt controller 712, the interrupt controller 712 can support the plurality of I/O controllers 702–706. In this case, the serial link bus 714 is shared by the I/O controllers 702–706. If each of the I/O controllers 702–706 supports n interrupt signals, then the sequencing of the transmission of the interrupt signals to the interrupt controller 712 could, for example, proceed as follows. First, the I/O controller 702 would transmit the interrupt signals for sources 1 to n, then the I/O controller 704 would transmit the interrupt signals for sources n+1 to 2n, and then the I/O controller 706 would transmit interrupt signals for sources 2n+1 to 3n. Hence, each of the I/O controllers 702–706 drive the serial link bus 714 at different times. Accordingly, the serial transmission approach provided by the invention is scaleable.

In still another embodiment of the invention, the need for the synchronization link 312 between the interrupt controller 308 and the I/O controller 302 is removed. In such an embodiment, the synchronization signal can be transmitted over the serial data link 310 in a synchronize mode, then once synchronization is established the mode can be switched to a data mode where the interrupt signals are transmitted over the serial data link 310. With such an embodiment, the synchronization and alignment provided by the invention are determined initially at the beginning of the transmission sequence and thus out of order sequences are not permitted.

The advantages of the invention are numerous. One advantage of the invention is that a large and scaleable number of interrupt signals can be flexibly handled with a remotely located interrupt controller while requiring only a few pins and connecting wires. Another advantage of the invention is a reduced latency due to synchronization and alignment of the serial transmission of interrupt signals to an interrupt controller with the sequential processing of those signals at the interrupt controller. Yet another advantage of the invention is the ability to handle both level sensitive and edge triggered interrupt sources.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An interrupt handling apparatus comprising:
    a first I/O controller in a first packaged integrated circuit chip, said first I/O controller receives or generates a plurality of incoming interrupt signals from a plurality of devices;
    an interrupt controller in a second packaged integrated circuit chip, said interrupt controller processes interrupts for a plurality of devices;
    a serial data link operatively connecting said first I/O controller of the first packaged integrated circuit chip and said interrupt controller of the second packaged integrated circuit chip; and
    a synchronization link operatively connecting said interrupt controller of the second packaged integrated circuit chip and said first I/O controller of the first packaged integrated circuit chip,
    wherein a synchronization signal is transmitted from said interrupt controller to said first I/O controller over said synchronization link, and the incoming interrupt signals are serially transmitted from said first I/O controller to said interrupt controller over said serial data link in accordance with the synchronization signal, and
    wherein the synchronization signal operates to align the serial transmission of the incoming interrupt signals with processing of the interrupts by said interrupt controller subject to a predetermined offset amount.

2. An interrupt handling apparatus as recited in claim 1, wherein said interrupt handling apparatus further comprises:
    a clock link, operatively connecting said interrupt controller of the second packaged integrated circuit chip and said first I/O controller of the first packaged integrated circuit chip, for supplying a clock signal from said interrupt controller to said first I/O controller such that the incoming interrupt signals are serially transmitted from said first I/O controller to said interrupt controller over said serial data link in accordance with the clock signal and the synchronization signal.

3. An interrupt handling apparatus as recited in claim 2, wherein said first I/O controller operates to transmit one of the incoming interrupt signals each cycle of the clock signal.

4. An interrupt handling apparatus as recited in claim 3, wherein the predetermined offset amount is a one or more of the cycles of the clock signal in duration.

5. An interrupt handling apparatus as recited in claim 1, wherein said first I/O controller comprises:
- a multiplexer having an input corresponding to each of the incoming interrupt signals and an output coupled to said serial data link, said multiplexer operates to connect one of the inputs to the output based on a send-index signal; and
- a synchronization coordinator for receiving the synchronization signal and producing the send-index signal.

6. An interrupt handling apparatus as recited in claim 5, wherein said interrupt handling apparatus further comprises:
- a clock link, operatively connecting said interrupt controller of the second packaged integrated circuit chip and said first I/O controller of the first packaged integrated circuit chip, for supplying a clock signal from said interrupt controller to said first I/O controller such that the incoming interrupt signals are serially transmitted from said first I/O controller to said interrupt controller over said serial data link in accordance with the clock signal and the synchronization signal, and
- wherein said synchronization coordinator updates the send-index signal each cycle of the clock signal so as to transmit a different one of the incoming interrupt signals each cycle of the clock signal.

7. An interrupt handling apparatus as recited in claim 5, wherein said synchronization coordinator further produces a start over signal to signal said first I/O controller to restart the transmission of the incoming interrupt signals in a predetermined order.

8. An interrupt handling apparatus as recited in claim 1, wherein said interrupt handling apparatus further comprises:
- a second I/O controller in a third packaged integrated circuit chip, said second I/O controller receives a plurality of incoming interrupt signals from a plurality of devices, and
- wherein said interrupt controller processes interrupts for the plurality of devices associated with both said first and second I/O controllers, said second I/O controller is operatively connected to said a serial data link and said synchronization link.

9. An interrupt handling apparatus as recited in claim 8, wherein the synchronization signal is transmitted from said interrupt controller to said first and second I/O controllers over said serial data link,
wherein during a first time period, the incoming interrupt signals received at said first I/O controller are serially transmitted from said first I/O controller to said interrupt controller over said serial data link in accordance with the synchronization signal,
wherein during a second time period, the incoming interrupt signals received at said second I/O controller are serially transmitted from said second I/O controller to said interrupt controller over said serial data link in accordance with the synchronization signal, and
wherein the second time period does not overlap with the first time period.

10. An interrupt handling apparatus as recited in claim 1, wherein the second packaged integrated circuit chip is a memory controller.

11. An interrupt handling apparatus as recited in claim 1, wherein the second packaged integrated circuit chip is a microprocessor.

12. An interrupt controller for receiving and processing a plurality of interrupt signals from a plurality of devices, said interrupt controller comprises:
- a serial data input port for receiving a serial stream of interrupt signals from an I/O controller;
- processing means for sequentially selecting and processing each of the interrupt signals within the serial stream;
- a synchronization manager for producing a synchronization signal, the synchronization signal being used to align the transmission of the interrupt signals within the serial stream to the respective processing of the received interrupt signals by said processing means; and
- a synchronization signal output port for forwarding the synchronization signal from said interrupt controller to the I/O controller.

13. An interrupt controller as recited in claim 12, wherein said synchronization manager comprises:
- means for producing the synchronization signal.

14. An interrupt handling apparatus as recited in claim 12, wherein the second packaged integrated circuit chip is a memory controller.

15. An interrupt handling apparatus as recited in claim 12, wherein the second packaged integrated circuit chip is a microprocessor.

16. A method for synchronizing transmission of interrupt signals from a first integrated circuit chip that receives the interrupt signals to an interrupt controller, said method comprising:
(a) placing the interupt signals to be transmitted in a first sequential order;
(b) receiving an alignment signal from the interrupt controller, the alignment signal being received over a synchronization link provided from the interrupt controller to the first integrated circuit chip; and
(c) serially transmitting the interrupt signals to the interrupt controller over a serial data link in accordance with the first sequential order and the alignment signal such that the transmission of the interrupt signals is aligned with processing of the interrupt signals at the interrupt controller so as to reduce latency.

17. A method as recited in claim 16,
wherein said receiving (b) further receives a clock signal from the interrupt controller, and
wherein said transmitting (c) operates to transmit the interrupt signals synchronized with the clock signal received from the interrupt controller.

18. A method as recited in 16, wherein said method further comprises:
(d) receiving the transmitted interrupt signals at the interrupt controller;
(e) processing the received interrupt signals in a second sequential order; and (f) producing and transmitting the alignment signal based on the second sequential order.

19. A method for transmitting interrupt signals to an interrupt controller from a first integrated circuit chip, said method comprising:

(a) placing the interrupt signals to be transmitted in a first sequential order;

(b) serially transmitting the interrupt signals to the interrupt controller over a serial data link in accordance with the first sequential order;

(c) receiving the series transmission of the interrupt signals at the interrupt controller;

(d) processing the received interrupt signals at the interrupt controller in a second sequential order; and (e) forwarding a synchronization signal from the interrupt controller to the first integrated circuit ship over a synchronization link to indicate a position in the second sequential order with respect to the first sequential order.

20. A method as recited in claim 19, wherein the second order follows the first order by some predetermined offset.

21. A method as recited in claim 19, wherein the synchronization signal includes a hold signal when said processing (d) deviates from the second sequential order.

22. A method as recited in claim 21, wherein the deviation from the second sequential order is temporary and then said processing (d) returns to the second sequential order, and wherein the hold signal causes said transmitting (b) to stop the first sequential order for a period of time.

* * * * *